Aug. 3, 1926.
H. BRUHN
1,594,515
CHUCK FOR STAY BOLTS AND THE LIKE
Filed Jan. 5, 1926
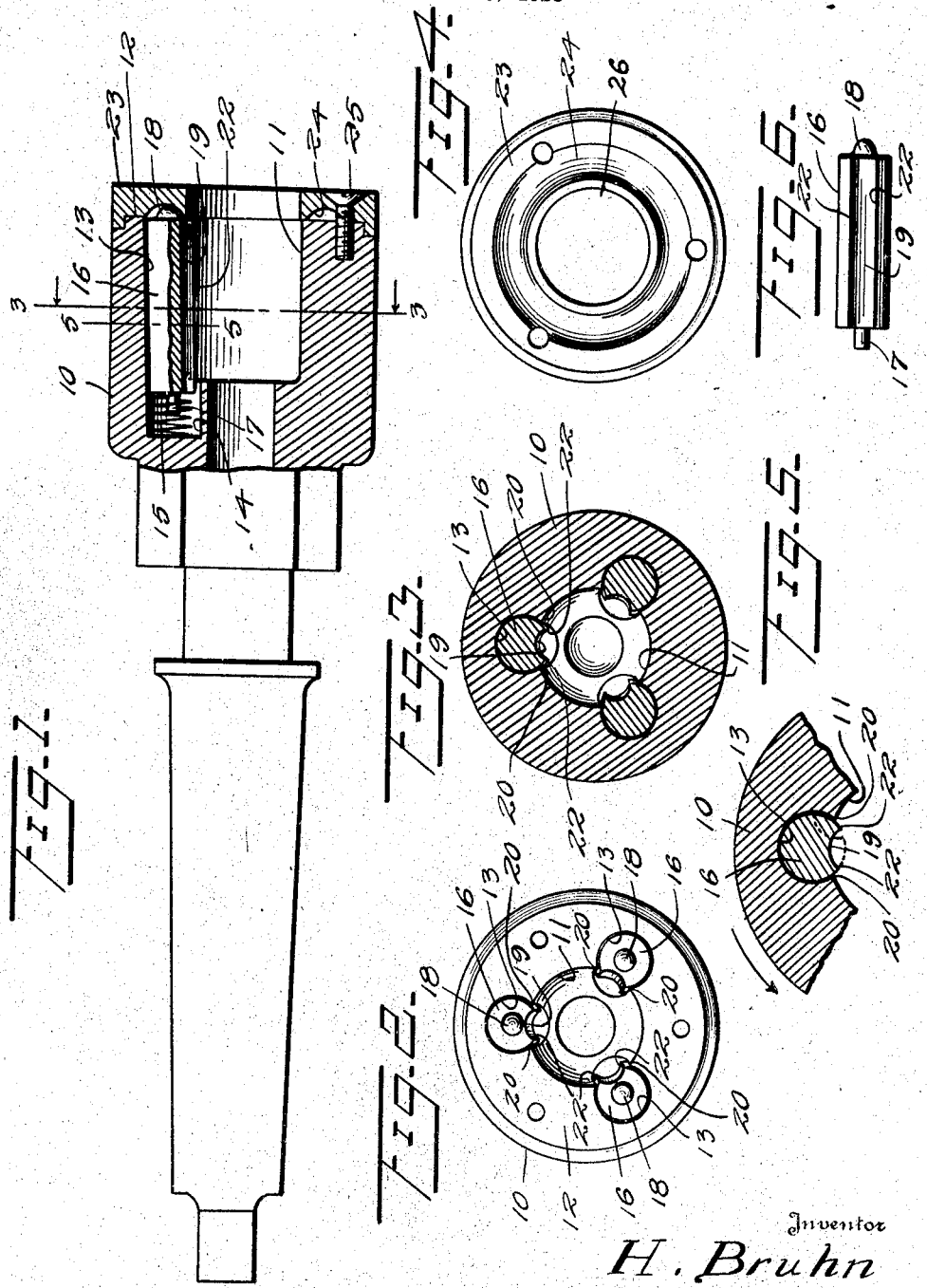
Inventor
H. Bruhn
By Watson E. Coleman
Attorney Patented Aug. 3, 1926.

1,594,515

UNITED STATES PATENT OFFICE.

HERMAN BRUHN, OF PARIS, TENNESSEE.

CHUCK FOR STAY BOLTS AND THE LIKE.

Application filed January 5, 1926. Serial No. 79,394.

This invention relates to chucks for stay-bolts and the like and has for an important object thereof the provision of a device for engaging relatively smooth shanked elements such as stay-bolts to attach the same to a motor or the like for rotation thereby to either withdraw or insert the bolt.

An important object of the invention is to provide a device of this character in which the gripping action with the engaged element is substantially instantaneous, regardless of the direction of rotation and in which the grip may be readily released to permit disengagement of the bolt.

A further object of the invention is to produce a device of this character which does not depend upon the action of springs or other mechanical elements for providing the grip but secures this grip through the tendency to relative rotation of the chuck and engaged element.

These and other objects I attain by the construction shown in the accompanying drawing, wherein for the purpose of illustration is shown a preferred embodiment of my invention and wherein:—

Figure 1 is an elevation partially in section of a chuck constructed in accordance with my invention;

Figure 2 is an end elevation of the chuck with the plate 23 removed;

Figure 3 is a section on the line 3—3 of Figure 1;

Figure 4 is an inside elevation of the plate 23;

Figure 5 is an enlarged detail section on the line 5—5 of Figure 1, the dotted lines illustrating the movement of the clutch elements when the chuck is rotated while in engagement with a bolt; and Figure 6 is a side elevation of one of the clutch elements.

Referring now more particularly to the drawing, the chuck includes a body 10 having formed therein an axial bore 11 of a predetermined size. The size of this bore will vary, depending upon the size of the stay-bolt which is to be engaged, it being understood that a separate chucking element is preferably provided for each side of the stay-bolt. The bore 11 opens through one end 12 of the body and the body is provided with further bores 13 circumferentially spaced and likewise opening through this end of the body. The bore 11 at its outer end intercepts each of the bores 13 and these bores 13 are upon axes converging as they depart from the end face 12 of the body so that the degree of interception of the bores 13 by the bore 11 increases with the depth of the bore 11.

These bores 13 are of slightly greater depth than the bore 11 providing pockets 14 in which are arranged springs 15. Clutch elements 16 are arranged within the bores 13, each clutch element being of slightly less length than the depth of the bore and of slightly less diameter than the bore so that it has a loose fit therein. Each clutch element 16 has preferably formed at one end thereof a pin 17 which engages and is centered by the spring 15 while at its outer end it is formed with a conical lug 18, the purpose of which will presently appear.

The outer face of the clutch element is provided with a longitudinally extending groove 19, the base of which is preferably arcuate upon a curve of less magnitude than the curvature of the wall of the bore 11. This groove is also of less width than the distance between adjacent edges 20 of the bore 13 formed by interception of this bore by the bore 11 so that the edges 22 formed by the groove constantly project into the bore 11. The clutch elements 16 are maintained in position within the bores 13 by an end plate 23 having upon its inner face a groove 24 into which the conical lugs 18 of the pins or clutch elements extend. This plate is suitably held in position by means of screws 25 or the like.

In the use of the device, the stay-bolt is entered through the central aperture 26 of the plate 23 into the bore 11 and in entering is engaged by the clutch elements, the edges of the slots 22 of which tend to slightly cut into the side surfaces of the bolt. The chuck is forcibly engaged with the bolt with the result that these clutch elements are forced back into their bores against the action of the springs 15 and accordingly these springs exercise a constant force, tending to maintain the engagement of the clutch elements with the bolt. If the chuck is now rotated, the tendency of the bolt to remain stationary will cause rotation of the clutch elements in one direction or the other with the result that the rounded faces of the clutch elements enter the bore 11, decreasing the effective size of the bore and securing the bolt against rotation with relation to the chuck. In order to properly maintain engagement, a slight pressure must be exercised against the end of the chuck during operation of inserting or removing the bolt. As soon as the desired operation has been effected, the chuck may be released by withdrawing the pressure and pulling upon the chuck. If the bolt is not readily released by this operation, a momentary reversal of the direction of rotation of the chuck while exercising a pull will complete the release.

It will be obvious that a structure of this character, due to the fact that it may be so readily applied to and removed from the stay-bolt, increases the speed of the operation of inserting or removing stay-bolts or similar bolts and will accomplish this without destructive gripping action with the stay-bolt head. Furthermore, since the chuck may be used without any changes to either insert or remove stay-bolts, considerable time is saved whenever a stay-bolt which is being inserted is found to be defective so that it must be removed.

Since the structure of the chuck is obviously capable of a certain range of change and modification without materially departing from the spirit of the invention, I do not limit myself to the specific structure hereinbefore set forth except as hereinafter claimed.

I claim:—

In a chuck for inserting or removing stay-bolts or the like, a body having an axial bore and a plurality of circumferentially spaced bores arranged about the axial bore, all of said bores opening through one end of the body, said axial bore intercepting said circumferentially spaced bores throughout its length, the circumferentially spaced bores converging toward the inner ends thereof whereby the degree of interception of said bores by the axial bore increases toward the inner ends of the bores and cylindrical clutch elements rotatable within said circumferentially spaced bores and each having a longitudinally extending groove in that portion thereof projecting into the axial bore.

In testimony whereof I hereunto affix my signature.

HERMAN BRUHN.